US010953932B2

(12) United States Patent
Wiegel

(10) Patent No.: US 10,953,932 B2
(45) Date of Patent: *Mar. 23, 2021

(54) MULTICOMPONENT IMPROVED VEHICLE FUEL ECONOMY SYSTEM

(71) Applicant: EkoStinger, Inc., Rochester, NY (US)

(72) Inventor: J. Parr Wiegel, Palmyra, NY (US)

(73) Assignee: EkoStinger, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,045

(22) Filed: Oct. 16, 2017

(65) Prior Publication Data

US 2019/0111978 A1 Apr. 18, 2019
US 2019/0315414 A9 Oct. 17, 2019

Related U.S. Application Data

(63) Continuation of application No. 15/014,449, filed on Feb. 3, 2016, now Pat. No. 9,815,505, which is a
(Continued)

(51) Int. Cl.
*B62D 35/00* (2006.01)
*B62D 35/02* (2006.01)
*B62D 37/02* (2006.01)

(52) U.S. Cl.
CPC .......... *B62D 35/001* (2013.01); *B62D 35/02* (2013.01); *B62D 37/02* (2013.01)

(58) Field of Classification Search
CPC .. B62D 35/001; B62D 35/002; B62D 35/004; B62D 35/02
(Continued)

(56) References Cited

U.S. PATENT DOCUMENTS

| | | | |
|---|---|---|---|
| 2,737,411 | A | 3/1956 | Potter |
| 3,253,337 | A | 5/1966 | Ebert |

(Continued)

FOREIGN PATENT DOCUMENTS

| | | | |
|---|---|---|---|
| CA | 1156293 | A | 11/1983 |
| CA | 2583852 | A1 | 10/2008 |

(Continued)

OTHER PUBLICATIONS

International Search Report and Written Opinion of the International Searching Authority in corresponding International Application No. PCT/US2013/068617, dated Feb. 24, 2014 (8 pages).
(Continued)

*Primary Examiner* — Gregory A Blankenship
(74) *Attorney, Agent, or Firm* — Brian B. Shaw, Esq.; Jodi A. Reynolds, Esq.; Harter Secrest & Emery LLP

(57) ABSTRACT

A semitrailer comprising a main frame having a hitch, an axle assembly connected to the main frame, the axle assembly including at least two wheels for rotation relative to the main frame, a fairing connected to an underside of the semitrailer intermediate the hitch and the axle assembly, the fairing including a pair of lateral surfaces, a bottom surface spaced from the underside of the semitrailer, and a leading surface, wherein the leading surface includes an intake opening, and wherein at least one of the bottom surface or the lateral surfaces includes an exit opening, and a flow path fluidly connects the intake opening and the exit opening.

23 Claims, 13 Drawing Sheets

Related U.S. Application Data continuation of application No. 14/425,244, filed as application No. PCT/US2013/068617 on Nov. 6, 2013, now Pat. No. 9,283,997, which is a continuation of application No. 13/839,662, filed on Mar. 15, 2013, now Pat. No. 8,985,677.

(60) Provisional application No. 61/723,506, filed on Nov. 7, 2012, provisional application No. 61/838,677, filed on Jun. 24, 2013, provisional application No. 61/838,111, filed on Jun. 21, 2013, provisional application No. 61/723,506, filed on Nov. 7, 2012.

(58) Field of Classification Search
USPC .................................................... 296/180.4
See application file for complete search history.

(56) References Cited

U.S. PATENT DOCUMENTS

| | | | |
|---|---|---|---|
| 3,977,716 A | 8/1976 | Whited | |
| 4,142,755 A | 3/1979 | Keedy | |
| 4,262,953 A * | 4/1981 | McErlane | B62D 35/001 180/89.1 |
| 4,418,853 A | 12/1983 | Shaffer | |
| 4,629,241 A | 12/1986 | Gruich | |
| 4,640,541 A * | 2/1987 | FitzGerald | B62D 35/001 280/851 |
| 4,688,824 A | 8/1987 | Herring | |
| 4,746,160 A | 5/1988 | Wiesemeyer | |
| 4,789,117 A * | 12/1988 | Paterson | B62D 35/00 138/37 |
| 4,877,266 A | 10/1989 | Lamparter et al. | |
| 5,052,741 A | 10/1991 | Brown et al. | |
| 5,080,397 A | 1/1992 | Metcalf | |
| 5,137,296 A | 8/1992 | Forman | |
| 5,232,234 A | 8/1993 | McCombs | |
| 5,280,990 A | 1/1994 | Rinard | |
| 5,314,201 A | 5/1994 | Wessels | |
| 5,609,384 A | 3/1997 | Loewen | |
| 5,921,617 A | 7/1999 | Loewen et al. | |
| 6,092,861 A | 7/2000 | Whelan | |
| 6,279,933 B1 | 8/2001 | Ross et al. | |
| 6,286,894 B1 | 9/2001 | Kingham | |
| 6,309,010 B1 | 10/2001 | Whittlen | |
| 6,409,252 B1 | 6/2002 | Andrus | |
| 6,457,833 B1 | 10/2002 | Ishikawa et al. | |
| 6,595,578 B1 | 7/2003 | Calsoyds et al. | |
| 6,644,720 B2 | 11/2003 | Long et al. | |
| 6,666,498 B1 | 12/2003 | Whittlen | |
| 6,685,256 B1 * | 2/2004 | Shermer | B60J 5/108 296/180.1 |
| 6,692,066 B2 | 2/2004 | Fairburn et al. | |
| 6,742,616 B2 | 6/2004 | Leban | |
| 6,789,839 B1 | 9/2004 | Samuelson | |
| 6,799,791 B2 | 10/2004 | Reiman et al. | |
| 6,837,536 B1 | 1/2005 | Schwartz | |
| 6,854,788 B1 | 2/2005 | Graham | |
| 6,932,419 B1 | 8/2005 | McCullough | |
| 6,959,958 B2 | 11/2005 | Basford | |
| 6,974,178 B2 | 12/2005 | Ortega et al. | |
| 6,986,544 B2 | 1/2006 | Wood | |
| 7,008,005 B1 | 3/2006 | Graham | |
| 7,093,889 B2 | 8/2006 | Graham | |
| 7,147,270 B1 | 12/2006 | Andrus et al. | |
| 7,207,620 B2 | 4/2007 | Cosgrove et al. | |
| 7,243,980 B2 | 7/2007 | Vala | |
| 7,255,387 B2 | 8/2007 | Wood | |
| 7,318,620 B2 | 1/2008 | Wood | |
| 7,374,230 B2 | 5/2008 | Breidenbach | |
| 7,380,868 B2 | 6/2008 | Breidenbach | |
| 7,404,592 B2 | 7/2008 | Reiman et al. | |
| 7,431,381 B2 | 10/2008 | Wood | |
| 7,497,502 B2 | 3/2009 | Wood | |
| 7,537,270 B2 | 5/2009 | O'Grady | |
| 7,559,165 B2 | 7/2009 | Wiegel | |
| 7,585,015 B2 | 9/2009 | Wood | |
| 7,699,382 B2 | 4/2010 | Roh et al. | |
| 7,726,724 B2 | 6/2010 | Kohls | |
| 7,740,303 B2 | 6/2010 | Wood | |
| 7,740,304 B1 | 6/2010 | Breu | |
| 7,748,771 B2 | 7/2010 | Distel et al. | |
| 7,748,772 B2 | 7/2010 | Boivin et al. | |
| 7,780,224 B2 | 8/2010 | Roush | |
| 7,784,854 B2 | 8/2010 | Breidenbach | |
| 7,789,453 B2 | 9/2010 | Roush et al. | |
| 7,806,464 B2 * | 10/2010 | Cardolle | B62D 35/001 296/180.1 |
| 7,837,254 B2 | 11/2010 | Reiman et al. | |
| 7,845,708 B2 | 12/2010 | Breidenbach | |
| 7,850,224 B2 | 12/2010 | Breidenbach | |
| 7,854,468 B2 | 12/2010 | Vogel et al. | |
| 7,857,376 B2 | 12/2010 | Breidenbach | |
| 7,866,734 B2 | 1/2011 | Mracek | |
| 7,887,120 B2 | 2/2011 | Boivin et al. | |
| 7,938,475 B2 | 5/2011 | Boivin et al. | |
| 7,942,466 B2 | 5/2011 | Rieman et al. | |
| 7,942,467 B2 | 5/2011 | Boivin et al. | |
| 7,942,468 B2 | 5/2011 | Boivin et al. | |
| 7,942,469 B2 | 5/2011 | Boivin et al. | |
| 7,942,470 B2 | 5/2011 | Boivin et al. | |
| 7,942,471 B2 | 5/2011 | Boivin et al. | |
| 7,950,721 B1 | 5/2011 | Peterson | |
| 7,976,096 B2 | 7/2011 | Holubar | |
| 7,992,666 B2 | 8/2011 | Otterstrom | |
| 8,007,030 B2 | 8/2011 | Wood | |
| 8,025,329 B1 | 9/2011 | Kron | |
| 8,025,330 B2 | 9/2011 | Reiman et al. | |
| 8,079,634 B2 | 12/2011 | Visser et al. | |
| 8,087,715 B2 | 1/2012 | Andrus et al. | |
| 8,100,461 B2 | 1/2012 | Smith et al. | |
| 8,162,381 B2 | 4/2012 | Tertnes | |
| 8,162,384 B2 | 4/2012 | Giromini et al. | |
| 8,177,286 B2 | 5/2012 | Brown et al. | |
| 8,177,287 B2 | 5/2012 | Vogel et al. | |
| 8,186,745 B2 | 5/2012 | Graham et al. | |
| 8,191,956 B1 | 6/2012 | Dixon, Jr. et al. | |
| 8,210,599 B2 | 7/2012 | Butler | |
| 8,251,436 B2 | 8/2012 | Henderson et al. | |
| 8,267,211 B2 | 9/2012 | Otterstrom | |
| 8,272,680 B2 | 9/2012 | Breidenbach | |
| 8,276,972 B2 | 10/2012 | Domo et al. | |
| 8,287,030 B2 | 10/2012 | Ryan et al. | |
| 8,292,351 B2 | 10/2012 | Boivin et al. | |
| 8,303,025 B2 | 11/2012 | Senatro | |
| 8,322,778 B1 * | 12/2012 | Pfaff | B62D 35/001 296/180.4 |
| 8,360,509 B2 | 1/2013 | Smith et al. | |
| 8,360,510 B2 | 1/2013 | Smith et al. | |
| 8,376,450 B1 | 2/2013 | Long et al. | |
| 8,408,570 B2 * | 4/2013 | Heppel | B62D 35/001 280/154 |
| 8,985,677 B2 * | 3/2015 | Wiegel | B62D 35/001 296/180.4 |
| 9,283,997 B2 * | 3/2016 | Wiegel | B62D 35/001 |
| 9,688,319 B2 * | 6/2017 | Traylor | B62D 35/001 |
| 9,815,505 B2 * | 11/2017 | Wiegel | B62D 35/001 |
| 10,081,397 B2 * | 9/2018 | Bacon | B62D 35/001 |
| 2002/0021023 A1 | 2/2002 | Leban | |
| 2002/0030384 A1 | 3/2002 | Basford | |
| 2003/0057736 A1 | 3/2003 | Long et al. | |
| 2003/0205913 A1 | 11/2003 | Leonard | |
| 2004/0119319 A1 | 6/2004 | Reiman et al. | |
| 2004/0256884 A1 | 12/2004 | Schwartz | |
| 2005/0104316 A1 | 5/2005 | Pappas | |
| 2005/0146161 A1 | 7/2005 | Uland | |
| 2005/0161976 A1 | 7/2005 | Ortega et al. | |
| 2005/0168012 A1 | 8/2005 | Ortega et al. | |
| 2006/0049665 A1 | 3/2006 | Graham | |
| 2006/0152038 A1 | 7/2006 | Graham | |
| 2007/0001481 A1 | 1/2007 | Breidenbach | |
| 2007/0024017 A1 | 2/2007 | Ramsey | |
| 2007/0046066 A1 | 3/2007 | Cosgrove et al. | |
| 2007/0120397 A1 | 5/2007 | Layfield et al. | |

(56) References Cited

U.S. PATENT DOCUMENTS

| | | |
|---|---|---|
| 2007/0126261 A1 | 6/2007 | Breidenbach |
| 2008/0048468 A1 | 2/2008 | Holubar |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0157560 A1 | 7/2008 | Spector |
| 2008/0164722 A1 | 7/2008 | Breidenbach |
| 2008/0296930 A1* | 12/2008 | Roush .................. B60S 9/02 296/180.4 |
| 2008/0303311 A1 | 12/2008 | Roh |
| 2008/0309122 A1 | 12/2008 | Smith et al. |
| 2009/0096250 A1 | 4/2009 | Kohls |
| 2009/0140542 A1 | 6/2009 | Breidenbach |
| 2009/0146453 A1 | 6/2009 | Ortega et al. |
| 2009/0179456 A1 | 7/2009 | Holubar |
| 2009/0189414 A1 | 7/2009 | Boivin et al. |
| 2009/0200834 A1 | 8/2009 | Vogel et al. |
| 2009/0212594 A1 | 8/2009 | Breidenbach |
| 2009/0212595 A1 | 8/2009 | Heppel |
| 2009/0212596 A1 | 8/2009 | Reiman et al. |
| 2009/0230726 A1 | 9/2009 | Reiman et al. |
| 2010/0066123 A1 | 3/2010 | Ortega et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0117396 A1 | 5/2010 | Dayton |
| 2010/0123333 A1 | 5/2010 | Breidenbach |
| 2010/0181799 A1 | 7/2010 | Ryan et al. |
| 2010/0264690 A1 | 10/2010 | Brown et al. |
| 2011/0025092 A1 | 2/2011 | Reiman et al. |
| 2011/0068603 A1 | 3/2011 | Domo et al. |
| 2011/0068605 A1 | 3/2011 | Domo et al. |
| 2011/0084516 A1* | 4/2011 | Smith .................. B62D 35/001 296/180.4 |
| 2011/0084517 A1 | 4/2011 | Vogel et al. |
| 2011/0101730 A1 | 5/2011 | Tertnes |
| 2011/0117396 A1* | 5/2011 | Yang .................. H01M 2/34 429/50 |
| 2011/0175393 A1 | 7/2011 | Cline |
| 2011/0175394 A1 | 7/2011 | Breidenbach |
| 2011/0175396 A1 | 7/2011 | Boivin et al. |
| 2011/0204677 A1 | 8/2011 | Wood |
| 2011/0210578 A1 | 9/2011 | Breidenbach |
| 2011/0221231 A1 | 9/2011 | Visser et al. |
| 2011/0233960 A1 | 9/2011 | Heinz |
| 2011/0272964 A1 | 11/2011 | Henderson et al. |
| 2011/0285167 A1 | 11/2011 | Butler |
| 2011/0304173 A1 | 12/2011 | Breidenbach |
| 2012/0001451 A1 | 1/2012 | Breidenbach |
| 2012/0032475 A1 | 2/2012 | Grandominico et al. |
| 2012/0074728 A1 | 3/2012 | Senatro |
| 2012/0086233 A1 | 4/2012 | Visser et al. |
| 2012/0086234 A1 | 4/2012 | Visser et al. |
| 2012/0091754 A1 | 4/2012 | Lee et al. |
| 2012/0104791 A1 | 5/2012 | Visentin |
| 2012/0104792 A1 | 5/2012 | Smith et al. |
| 2012/0119540 A1 | 5/2012 | Breidenbach |
| 2012/0126572 A1 | 5/2012 | Hjelm et al. |
| 2012/0153668 A1 | 6/2012 | van Raemdonck |
| 2012/0200113 A1 | 8/2012 | Brown et al. |
| 2012/0261945 A1 | 10/2012 | Litchfield |
| 2012/0299330 A1 | 11/2012 | Breidenbach |
| 2013/0106135 A1 | 5/2013 | Praskovsky et al. |
| 2013/0127204 A1 | 5/2013 | Johnson et al. |
| 2013/0249241 A1* | 9/2013 | Baker .................. B62D 35/001 296/180.4 |
| 2015/0015029 A1 | 1/2015 | Wiegel |
| 2015/0239513 A1* | 8/2015 | Lofton .................. B62D 35/02 296/180.4 |
| 2016/0052566 A1* | 2/2016 | Bacon .................. B62D 35/001 296/180.4 |
| 2017/0240220 A1* | 8/2017 | Kron .................. B62D 35/001 |
| 2017/0349224 A1* | 12/2017 | Logounov ............ B62D 35/001 |

FOREIGN PATENT DOCUMENTS

| | | |
|---|---|---|
| DE | 3115742 A1 | 11/1982 |
| EP | 51093 A1 | 5/1982 |
| EP | 2206639 A1 | 7/2010 |
| FR | 2623155 A1 | 5/1989 |
| GB | 2063799 A | 6/1981 |
| GB | 2065047 B | 6/1981 |
| WO | 1997048590 A1 | 12/1997 |
| WO | 20060066217 A2 | 6/2006 |
| WO | 2008024386 A2 | 2/2008 |
| WO | 2008033725 A2 | 3/2008 |
| WO | 2008124573 B1 | 10/2008 |
| WO | 2008144025 A2 | 11/2008 |
| WO | 2009022904 A1 | 2/2009 |
| WO | 2009105623 A1 | 8/2009 |
| WO | 20100026442 A1 | 3/2010 |
| WO | 2010053409 A1 | 5/2010 |

OTHER PUBLICATIONS

Ihlein et al.: "Truckin" On Drag Coefficients of Tractor Trailer Trucks, May 2, 2007 17 pages.

Reducing Aerodynamic Drag on Heavy Trucks: Lawrence Livermore National Laboratory http://techportal.eere.energy.gov/technology.do/techID+507 (Dec. 14, 2012) 3 pages.

Quain: Stretching Trucks' Mileage—The New York Times article http://www.nytimes.com/2012/12/20/automobiles/stretching-trucks-mileage.html?. . . 2 pages Dec. 28, 2012.

On Aerodynamics: The Effect of Aerodynamics on Tractor Trailers, dated Apr. 16, 2013 (2 pages) http://freightwing.com/on-aerodynamics.php.

Thomson Patent Search Report, dated Dec. 12, 2012.

International Preliminary Report on Patentability in corresponding International Application No. PCT/US2013/068617 dated May 21, 2015 (6 pages).

Final Office Action received in U.S. Appl. No. 13/839,662 dated Sep. 4, 2014 (7 pates).

European Patent Office, Extended European Search Report (EESR) in corresponding European Patent Application No. 13852841.9, completed Jun. 29, 2016.

* cited by examiner

MULTICOMPONENT IMPROVED VEHICLE FUEL ECONOMY SYSTEM

CROSS-REFERENCE TO RELATED APPLICATIONS

The present application is an International Application claiming priority to U.S. Provisional Application No. 61/838,677 filed Jun. 24, 2013; U.S. Provisional Application No. 61/838,111 filed Jun. 21, 2013; U.S. patent application Ser. No. 13/839,662 filed Mar. 15, 2013; and U.S. Provisional Application No. 61/723,506 filed Nov. 7, 2012; the entire disclosures of which are expressly incorporated by reference.

TECHNICAL FIELD

The present disclosure relates to overland vehicles and more particularly to decreasing the aerodynamic drag of such vehicles and more particularly to semitrailers.

In another configuration, the present disclosure provides a fairing system for semitrailers and particularly for semitrailers having a movable axle assembly—often referred to as a bogie or tandem. For purposes of the present disclosure, the term axle assembly is intended to be interchangeable with bogie, tandem or other equivalent terms.

BACKGROUND ART

Most of today's tractor-trailers get about 6-7 mpg of fuel leaving significant potential for improving fuel economy of tractor-trailers. Reducing the fuel consumption of tractor-trailers would directly impact transportation costs of goods, serving businesses and consumers alike.

Fuel consumption of a tractor-trailer is influenced by the amount of drag forces incurred by the vehicle while traveling. As the drag forces increase, fuel consumption also increases. One area of a semitrailer where drag forces are high is the undercarriage of a semitrailer. Another area of the semitrailer where aerodynamic forces are high is the rear end of a semitrailer container. When the tractor-trailer is traveling, air flows under and around the semitrailer, placing significant drag forces on the wheels, undercarriage and rear of the truck. The tractor-trailer must use more power to overcome the drag, thereby increasing fuel consumption. Thus, it is most desirable to reduce drag beneath the undercarriage and at the rear end of a semitrailer.

What is needed then is a drag reduction system for a semitrailer that improves fuel economy.

It would, therefore, be desirable to provide a drag reduction system for a semitrailer that overcomes the aforesaid and other disadvantages.

DISCLOSURE OF INVENTION

The present invention provides a fairing system for semitrailers for decreasing aerodynamic drag. One configuration of the invention is a drag force reduction system comprising a semitrailer having a main frame extending along a longitudinal axis and a subframe movably connected to the main frame between a first position along the longitudinal axis and a second position along the longitudinal axis. An axle assembly is attached to the subframe, wherein the axle assembly includes an axle, a plurality of wheels and a suspension. A fairing is located under the main frame and is separated from the axle assembly along the longitudinal axis by a given spacing. The fairing is movable relative to the main frame to maintain the given spacing between the axle assembly and the fairing independent of the subframe and hence axle assembly being in the first position or the second position. In one configuration, the fairing is slidably connected to the main frame. In another configuration, the fairing is slidably connected to the axle assembly.

The fairing can include a fairing frame having a mounting portion and a frame retaining portion, wherein the mounting portion is movable relative to the retaining portion along the longitudinal axis. In one configuration, the fairing is affixed to one of the axle assembly and the subframe at a given spacing, which may be adjustable within a predetermined fairing range of motion. In one configuration, the fairing is connected to the subframe and translatable relative to the subframe. The fairing includes an aerodynamic structure formed of one of metal, aluminum, plastic, ABS, Poly Carbonate, TPO and other polymers.

In one configuration, the fairing includes a bottom and a leading apex formed of a plurality of converging planar regions. The fairing includes a bottom surface and a trailing surface, a leading surface and lateral surfaces, the bottom surface and the trailing surface substantially enclosing a volume beneath the semitrailer. A plurality of lighting elements can be disposed along at least a portion of the fairing.

The fairing can include an intake opening and at least one flow path fluidly connecting the intake opening and an exit-opening formed in the fairing. The at least one flow path may include at least one venting duct extending from the intake opening to the at least one exit-opening. The at least one exit-opening has a cross-sectional area less than a cross-sectional area of the intake opening. The at least one exit-opening can have a cross-sectional area equal to a cross-sectional area of the intake opening.

In a configuration, the main frame further includes a plurality of elongate beams extending along a longitudinal axis and a plurality of cross beams connected to the elongate beams and extending transverse to the longitudinal axis, an upper surface of the cross beams and the elongate beams supporting a decking, and the decking, the elongate beams and the cross beams defining a plurality of cavities opening to an underside of the semitrailer, wherein a covering on an underside of the semitrailer substantially occludes the plurality of cavities. The covering can be connected to the elongate beams and the cross beams. A portion of the covering can be disposed between the wheels and one of the elongate beams and the cross beams. The covering can be selected from the group consisting of a polymer, composite, laminate, metal, and plastic.

In another configuration, a semitrailer comprises a main frame, hitch a wheel set connected to the main frame, the wheel set including at least two wheels for rotation relative to the main frame, a closable container on the main frame, the container having a rear end and a pair of doors movable between a closed position and an open position, each door hingedly connected to the container to pivot about a vertical axis, a vertical flap, at least an upper hinge and a lower hinge hingedly connected to one of the doors and the vertical flap to pivot the vertical flap about a vertical axis, and an interconnector extending between the upper hinge and the lower hinge, such that upon movement of the lower hinge from an open configuration to a closed configuration, the upper hinge moves from an open configuration to a closed configuration. The interconnector may have a u-shaped base having two legs and a closed end rotatably connected to one of the doors and two legs, each leg pivotally coupled to the upper hinge and lower hinge, respectively. The interconnector, in one configuration, is a bar connected to the upper hinge and lower hinge. The semitrailer can further comprise a horizontal top flap and a top hinge connected to one of the doors and the horizontal top flap to pivot the horizontal top flap about a horizontal axis. The semitrailer can further include a first link having a first end pivotally connected to the horizontal top flap and a second end pivotally connected to a slider, wherein the slider is connected to the door to vertically slide along a vertical axis. In a configuration, a vertical flap and horizontal top flap is hingedly connected to each door. Each vertical flap and horizontal top flap can be an aerodynamic panel formed of a material selected from the group consisting of plastic, metal, fabric, cardboard, and framed fabric.

In yet another configuration, a semitrailer includes a main frame, a wheel set connected to the main frame, the wheel set including a leading axle and a trailing axle, each of the leading axle and the trailing axle having at least two wheels for rotation relative to the main frame, and a diffuser extending about a portion of the leading axle, the diffuser extending along a majority of the distance between the wheels of leading axle, wherein the diffuser directs a passing air flow toward the ground. The diffuser can extend rearward to the trailing axle and may encompass a portion of the trailing axle. The diffuser locates a portion of the leading axle and the trailing axle between the diffuser and the main frame.

In yet another configuration, a semitrailer includes an underside, a hitch, a wheel set, a frame connected to the underside of the semitrailer intermediate the hitch and wheel set, the frame having a front portion, a back portion, a bottom portion and two opposing lateral sides, a skin enclosing at least one portion of the frame, and a back unit for mounting to a back planar surface of the semitrailer, the back unit having (i) first and second frames formed of a plurality of struts, each frame having a base portion arranged proximate the back planar surface of the semitrailer and a protruding portion of the frame arranged distal to the back planar surface of the semitrailer, wherein the base portion of the first frame circumscribes a first portion of the back planar surface of the semitrailer and wherein the base portion of the second frame circumscribes a second portion of the back planar surface of the semitrailer, and (ii) a material substantially enclosing the back unit frames. The first and second frames can each form approximately ½ of a pyramid. The back planar surface of the semitrailer can include fixed hinges and hinge bolts for receiving a first terminal end of each strut of the frame, wherein the first termination end of each strut includes a pivoting connector arranged to engage one of the hinge bolts.

In another configuration, a semitrailer comprises a main frame having a hitch, an axle assembly connected to the main frame, the axle assembly including at least two wheels for rotation relative to the main frame, a fairing connected to an underside of the semitrailer intermediate the hitch and the axle assembly, the fairing including (i) a pair of lateral surfaces, (ii) a bottom surface spaced from the underside of the semitrailer, and (ii) a leading surface. In a further configuration, the leading surface includes an intake opening, and wherein at least one of the bottom surface or the lateral surfaces includes an exit opening, and a flow path fluidly connects the intake opening and the exit opening. In one configuration, the fairing is movable relative to a main frame of the semitrailer to maintain a given spacing between the axle assembly and the fairing independent of the axle assembly being in a first position or a second position. The main frame can further includes a plurality of elongate beams extending along a longitudinal axis and a plurality of cross beams connected to the elongate beams and extending transverse to the longitudinal axis, an upper surface of the cross beams and the elongate beams supporting a decking and the decking, the elongate beams and the cross beams defining a plurality of cavities opening to an underside of the semitrailer, wherein a covering on an underside of the semitrailer substantially occludes the plurality of cavities. The covering in one configuration is connected to the elongate beams and the cross beams. A portion of the covering can be disposed between the wheels and one of the elongate beams and the cross beams, wherein the covering comprises a material selected from the group consisting of a polymer, composite, laminate, metal, and plastic.

In one configuration, the lateral surfaces are separated by a distance and the leading surface substantially spans the distance, wherein the bottom surface spans an area bounded by the lateral surfaces and the leading surface and includes an angled portion extending away from the underside of the semitrailer. In this configuration, the leading surface defines a bow having a shape selected from the group consisting of flat, curved, arched, angled, tumblehoned, plumed, raked, and spooned. The leading surface can includes first and second venting ducts extending from an intake opening in the leading surface to the exit—opening in each corresponding lateral surface, wherein air exiting the exit-openings reduces a pressure on an outside surface of the fairing and/or on at least one of (i) the bottom surface of the fairing, and (ii) the lateral surface.

In yet another configuration, the semitrailer comprises a back unit for mounting to a back planar surface of the semitrailer, the back unit having (i) first and second frames formed of a plurality of struts, each frame having a base portion arranged proximate the back planar surface of the semitrailer and a protruding portion of the frame arranged distal to the back planar surface of the semitrailer, wherein the base portion of the first frame circumscribes a first portion of the back planar surface of the semitrailer and wherein the base portion of the second frame circumscribes a second portion of the back planar surface of the semitrailer, and (ii) at least one skin substantially enclosing the first and second frames. The semitrailer in one configuration includes a closable container on the main frame, the container having a rear end and a pair of doors movable between a closed position and an open position, each door hingedly connected to the container to pivot about a vertical axis, a vertical flap, at least an upper hinge and a lower hinge hingedly connected to one of the doors and the vertical flap to pivot the vertical flap about a vertical axis, and, an interconnector extending between the upper hinge and the lower hinge, such that upon movement of the lower hinge from an open configuration to a closed configuration, the upper hinge moves from an open configuration to a closed configuration. A diffuser extends about a portion of a leading axle and a trailing axle of the axle assembly, wherein the diffuser directs a passing air flow toward the ground.

BRIEF DESCRIPTION OF DRAWINGS

The foregoing features of this invention, as well as the invention itself, may be more fully understood from the following description of the drawings in which.

BEST MODE(S) FOR CARRYING OUT THE INVENTION

At the outset, it should be appreciated that like drawing numbers on different drawing views identify identical structural elements of the invention. While the present invention is described with respect to what is presently considered to be the preferred embodiment, it is understood that the invention is not limited to the disclosed embodiment.

Furthermore, it is understood that the invention is not limited to the particular methodology, materials, and modifications described and as such may vary. It is also understood that the terminology used herein is for the purpose of describing particular elements only, and is not intended to limit the scope of the present invention, which is limited only by the appended claims.

The drag force reduction system increases fuel economy for tractor-trailer trucks, straight trucks, cargo carriers, school buses and the like by reducing drag under the vehicle and off the back of the vehicle.

Figure 1:
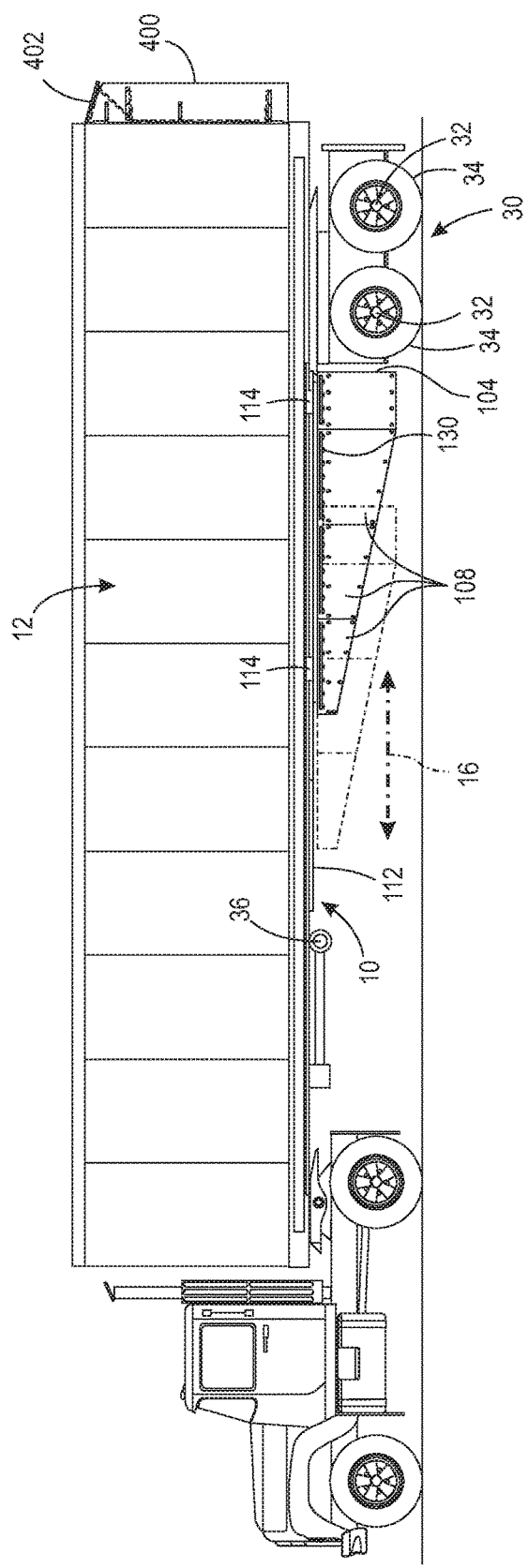
FIG. 1 is a left side view of a drag force reduction system showing a fairing system and a rear flap system for a semitrailer, the semitrailer having a moveable axle assembly.
Figure 2:
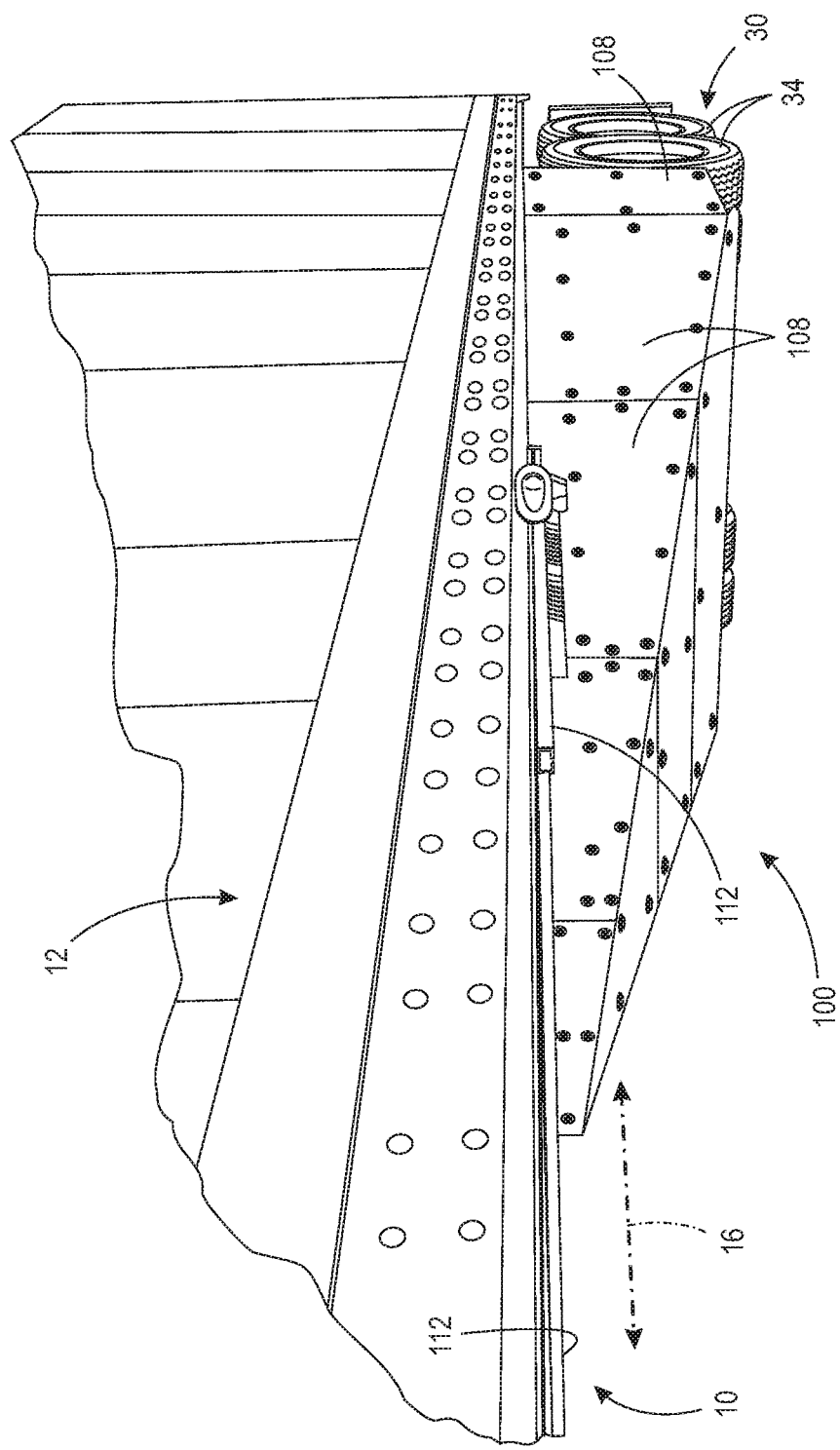
FIG. 2 is a perspective view of the fairing system coupled to an undercarriage of the semitrailer.
Figure 3:
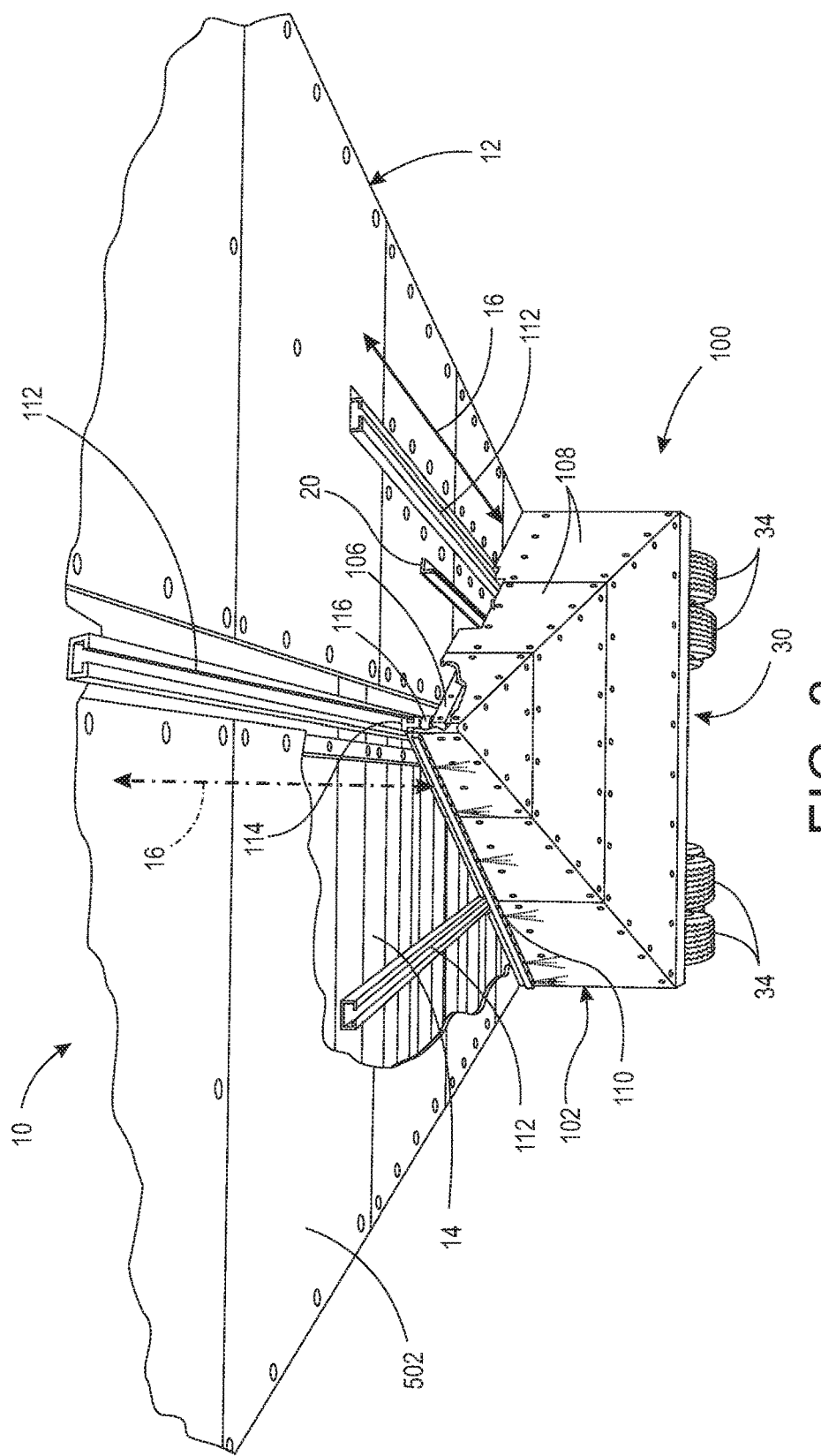
FIG. 3 is a perspective view of the fairing system moveably coupled to the undercarriage of the semitrailer.

Averting now to the Figures, FIGS. 1 and 3 show a fairing system 100 coupled to an undercarriage 10 of a semitrailer 12. As shown in FIGS. 1-4, the semitrailer 12 includes a main frame 14 extending along a longitudinal axis 16, wherein the longitudinal axis 16 is generally the major axis of the semitrailer 12 and extends along the length of the semitrailer 12.

The semitrailer 12 can include any of the standard components known in the art including, but not limited to a coupling such as king pin, lighting, hoses, cabling or wiring. The semitrailer 12 can also include landing gear as known in the art. It is understood the semitrailer 12 can be any of the known configurations including but not limited to dump semitrailers, container semitrailers, chip van, refrigerated, log, flatbed or tank semitrailer.

The semitrailer 12 includes a subframe 18 as shown in FIG. 3 movably connected to the main frame 14. In one configuration, the subframe 18 is movably connected to the main frame 14 by means of a plurality of tracks 20, such that the subframe 18 can move along the tracks 20 to be located at any of a number of positions along the longitudinal axis 16. The use of a subframe 18 and interconnection to the main frame 14 is known in the art. Representative disclosures include U.S. Pat. Nos. 5,314,201; 5,232,234; 5,137,296 and 6,279,933, each of which is hereby expressly incorporated by reference.

The interconnection of the subframe 18 and the main frame 14 provide for the subframe 18 to be located at any of a multitude of positions along a range of motion, wherein the range of motion can be as long as ten (10) feet.

The subframe 18 carries an axle assembly 30 and the axle assembly 30 includes at least an axle 32, a plurality of wheels 34, and a suspension (not shown). In many configurations, the axle assembly 30 includes brakes, hydraulics, air lines, and connections to air ride systems as known in the art. It is understood the axle assembly 30 can include one, two or more axles, wherein each axle can include two or more wheels. Thus, as well known in the art, the motion of the axle assembly 30 relative to the main frame 14 locates the wheels 34 at correspondingly different locations along the longitudinal axis 16. Thus, for example, locating the wheels 34 closer to a front of the main frame 14 allows for easier maneuverability in congested areas and tight-radius turns, such as at an intersection. In addition, selective location of the axle assembly 30 provides for improved load distribution.

The fairing system 100 further includes a fairing 102 located under the main frame 14 and spaced from the axle assembly 30 along the longitudinal axis 16 by a given distance. In select configurations, the given distance is adjustable, typically within a faring range of motion less than approximately three (3) feet. Further, the faring range of motion extends from a proximate position locating a portion of the fairing 102 approximately one (1) inch from the wheels 34 of the axle assembly 30 to approximately three (3) feet from the wheels 34.

The fairing 102 produces a smooth outline and reduces drag with respect to passing airflow, such as induced when the semitrailer 12 is being towed by a tractor. The fairing 102 can extend along the longitudinal axis 16 from adjacent landing gear 36 to adjacent the wheels of the axle assembly—subject to the fairing range of motion as set forth above. It is understood the fairing 102 can extend along the longitudinal axis 16 for an little as ten percent (10%) of the distance between the wheels 34 and the landing gear 36 to one-hundred ten percent (110%) of the distance thereby encompassing the landing gear 36. In one configuration, the fairing 102 extends along approximately half the distance between the landing gear 36 and the axle assembly 30. Advantageously, the fairing 102 extends as close to the roadway as operationally possible and is at least as wide as the width of the axle assembly 30. The fairing 102 can extend across substantially the entire width of the semitrailer or a percentage of the width. Thus, the width of the fairing 102 may encompass the width of the wheels 34, or terminate within the spacing between the wheels 34. It is further contemplated the fairing 102 can have lateral extensions located outside the width of the wheels 34, and thus can locate at least a portion of the wheels 34 between the lateral extensions in select positions of the fairing 102 relative to the axle assembly 30.

The fairing 102 is movable relative to the main frame 14 such that as the subframe 18 (and axle assembly 30) are moved along the longitudinal axis 16 relative to the main frame 14, the given spacing between the axle assembly 30 and the fairing 102 is maintained. That is, the position of the fairing 102 relative to the axle assembly 30 is independent of the position of the axle assembly 30 relative to the main frame 14. As the axle assembly 30 is moved relative to the main frame 14 (thereby accommodating a different turning-radius or load distribution) the fairing 102 is maintained in a constant position relative to the wheels 34 of the axle assembly 30.

It has been found that by locating a rear edge 104 of the fairing 102 as near as possible to the wheels 34 of the axle assembly 30, the efficiency of the semitrailer 12 increases (or conversely the required gas consumption decreases). However, it is understood that various road conditions, loads or environmental conditions may require the spacing between the fairing 102 and the wheels 34 be adjusted within the fairing range of motion. That is, the aerodynamic efficiency of the fairing 102 can be dependent on the specific spacing of the fairing 102 and the wheels 34 for a given set of operating conditions. Thus, the fairing 102 can be mounted at any of the variety of locations along the faring range of motion relative to the axle assembly 30 to maximize the effectiveness of the fairing 102. However, once the relative position of the fairing 102 relative to the axle assembly 30 has been temporarily fixed or selected, the fairing 102 and the axle assembly 30 translate as a unit relative to the semitrailer main frame 14.

The fairing 102 can include a fairing frame 106 as shown in FIG. 3 upon which is retained or disposed a covering 108 to form an aerodynamic shape. The aerodynamic shape of the fairing 102 can be any shape that reduces aerodynamic drag. The fairing frame 106 can define any of a variety of shapes from curvilinear surfaces, such as a dome to a point or a pyramidal shape.

Figure 4:
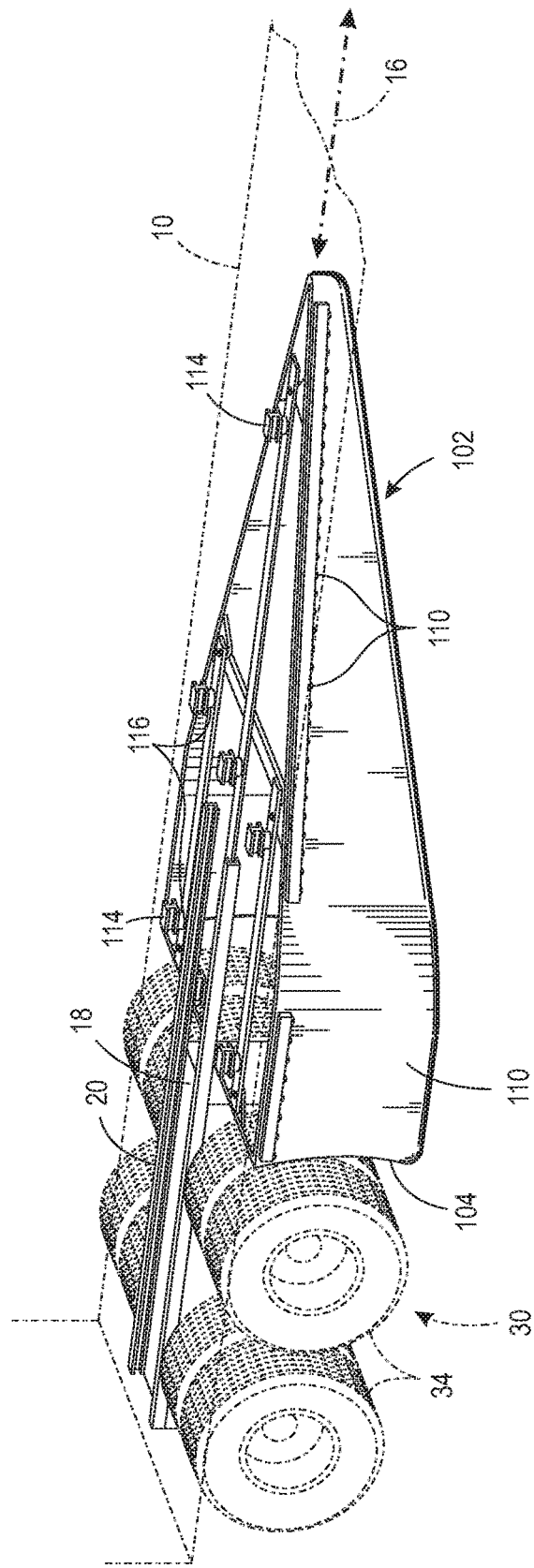
FIG. 4 is a perspective view of an integral fairing system moveably coupled to the undercarriage of the semitrailer.

As shown in FIGS. 3 and 4, the fairing 102 can include lighting 110 for safety, visibility and marketing. The lighting 110 can be any known in the art including LED, wherein control of the lighting can be provided by a tractor or control within the fairing. In one configuration, the lighting 110 is disposed along the perimeter edge of the lateral surface of the fairing.

While the fairing 102 is described in terms of a fairing frame 106 and covering 108, it is understood the fairing frame 106 and covering 108 can be a substantially integral or blended in structure, such as by molding or forming, as show in FIG. 4. In this construction, the fairing 102, or at least portions of the fairing 102, can be formed by molding polymer. Alternatively, the fairing 102 can be formed of a combination of frame sections and integral (molded) sections.

The mounting or connection of the fairing 102 relative to the semitrailer 12 can be accomplished through a variety of configurations.

In one configuration, the main frame 14 includes at least one and can be as many as a multitude of tracks 112 extending along the longitudinal axis 16. The fairing frame 106 includes a corresponding number of slides or bosses 114 slidably received within the tracks 112 such that the fairing 102 can move relative to the main frame 14. The fairing frame 106 is further connected to the axle assembly 30 or the subframe 18, such that as the axle assembly 30 is moved relative to the main frame 14, the fairing 102 is correspondingly moved within the tracks 112 along the longitudinal axis 16. This maintains the relative spacing between the fairing 102 and the wheels 34 of the axle assembly 30 independent of movement of the main frame 14 relative to the axle assembly 30 and/or subframe 18.

In one configuration, it is contemplated the slides 114 of the fairing 102 can include setoffs or standoffs 116 which space a portion of the fairing frame 106 below the subframe 18 to avoid interference with the subframe 18.

It is contemplated the connection of the fairing 102 to the axle assembly 30 (subframe 18) is adjustable within the fairing range of motion, such as the previously disclosed one (1) inch to three (3) feet.

Figure 6A:
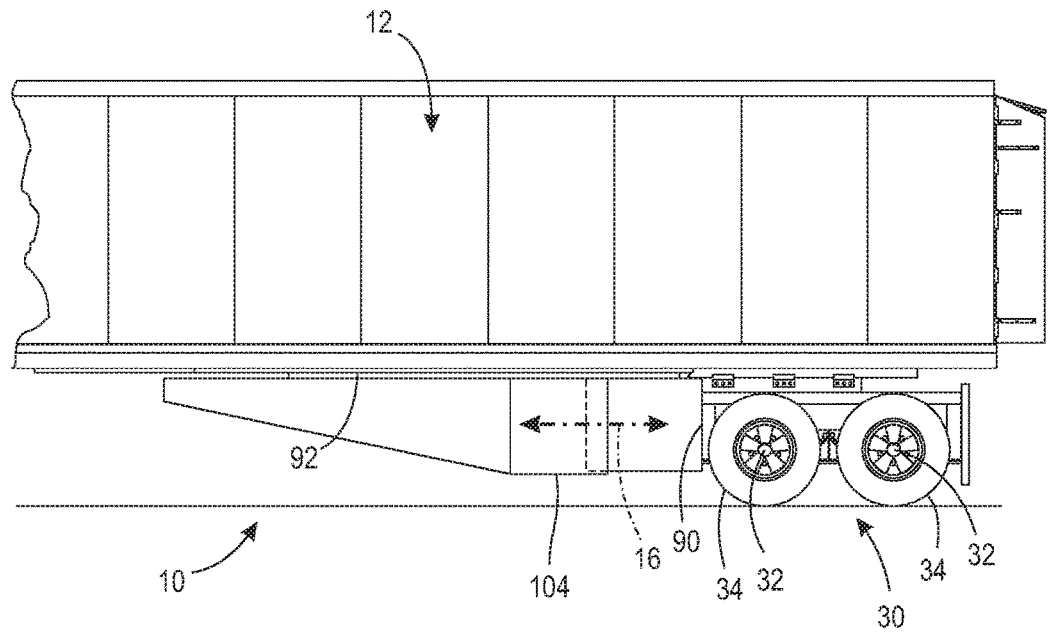
FIGS. 6A and 6B are partial left side views of the semitrailer showing a telescoping configuration of the fairing system.
Figure 6B:
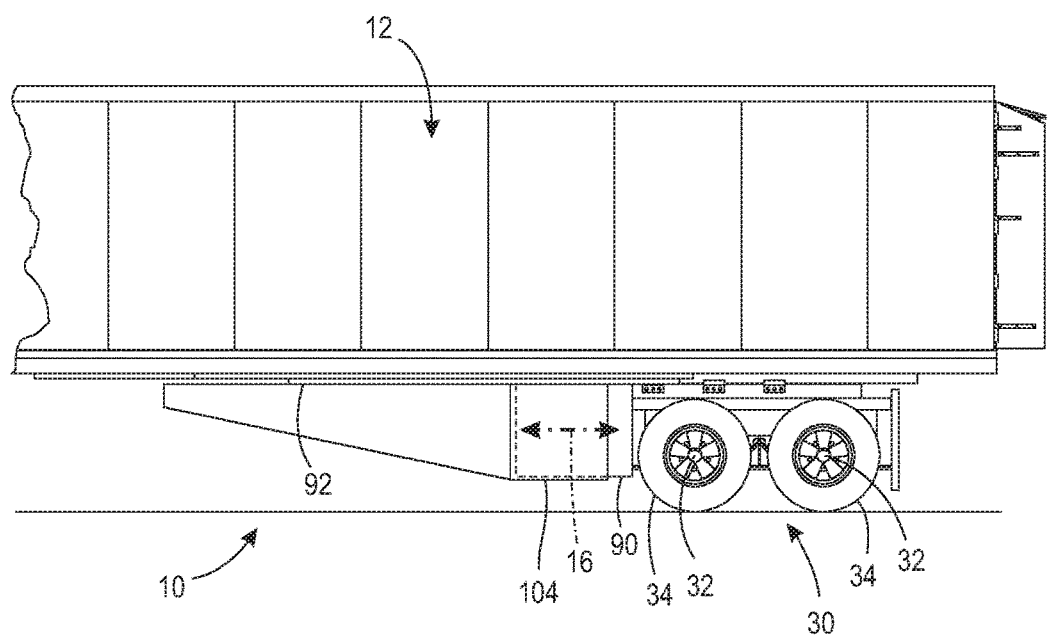

In a further configuration as shown in FIGS. 6A and 6B, the fairing 102 includes a mounting portion 90 and a frame retaining portion 92, wherein a telescoping or slide interconnection is formed between the mounting portion 90 and the frame retaining portion 92. The mounting portion 90 is configured to affix to the subframe 18 or axle assembly 30 and the frame retaining portion 92 is configured for supporting or defining the fairing 102. The range of motion between the mounting portion 90 and the frame retaining portion 92 define the fairing range of motion—from one (1) inch to three (3) feet. The mounting portion 90 and frame retaining portion 92 can be releasably, but fixedly connected so that an operator can adjust and then trail the semitrailer 12 with the fairing 102 in a selected position relative to the wheels 34 (axle assembly 34). In this configuration, as the fairing frame 106 is mounted only to the axle assembly 34 (or the subframe 18) rather than the main frame 14 and there is no need for the tracks 112 along the underside of the main frame 14.

It is contemplated the fairing 102 can have a substantially open rear end, a closed rear end or a partly occluded rear end. That is, the fairing 102 can define the air flow deflecting surface wherein the rear of the fairing (facing the axle assembly) is open forming a pocket. Alternatively, the fairing 102 can define a substantially enclosed volume precluding ingress or egress. In a further configuration, the fairing 102 can have a partially occluded rear end, such as by panels or sections inhibiting a flow into the pocket of the fairing from the rear. Depending on the specific configuration, the panels can be located at different positions along the longitudinal axis. Thus, some panels in at the rear of the fairing can be proximal to the axle assembly and other panels can be distal to the axle assembly.

Figure 7:
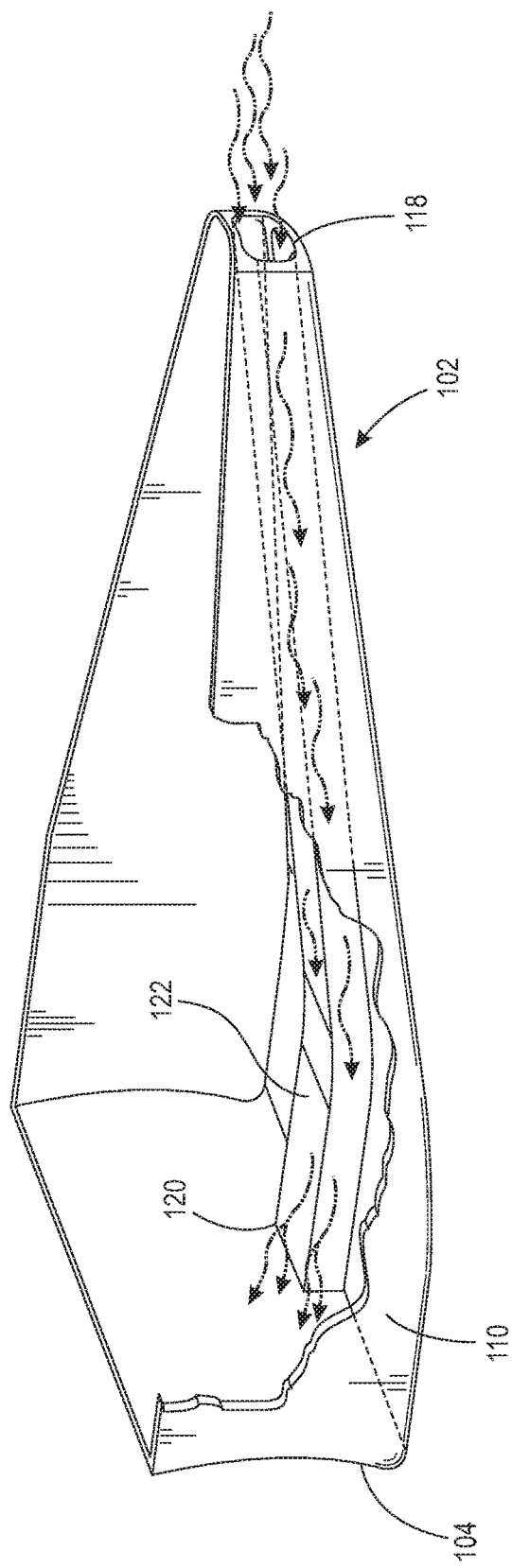
FIG. 7 is a perspective view of the fairing showing an intake opening and an exit opening fluidly coupled by a venting duct.

As shown in FIG. 7, the fairing 102 can include an intake opening 118 and at least one flow path fluidly connecting the intake opening 118 and an exit-opening 120. In a configuration, the flow path fluidly connecting the intake opening 118 and the exit-opening 120 is formed from at least one venting duct 122. The exit-opening 120 can have a cross-sectional area less than or equal to a cross-sectional area of the intake opening 118.

Figure 5:
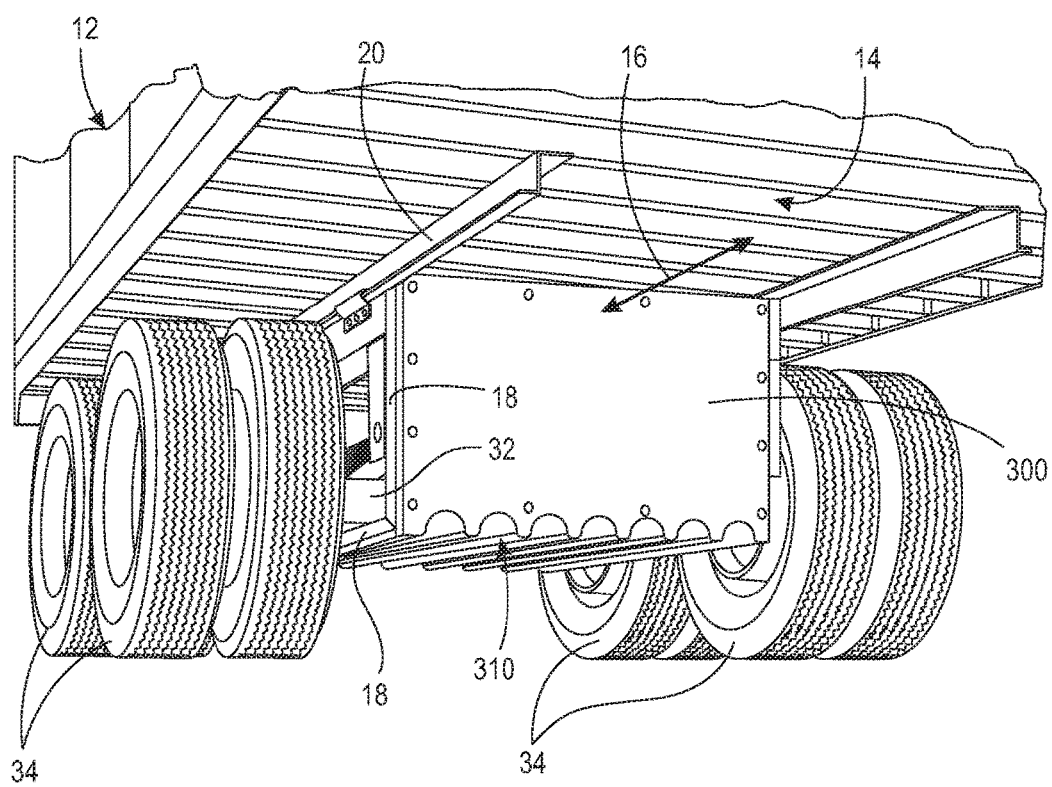
FIG. 5 is a partial perspective view of the undercarriage of the semitrailer showing a diffuser having channels.

In a further configuration, as shown in FIG. 5, the disclosure provides a diffuser 300 for reducing air flow between spaced axles in the axle assembly 30, such as a tandem. The diffuser 300 defines a generally curvilinear surface at least partially encompassing a diameter of at least one of a leading and a trailing axle in the axle assembly, as shown in the pictures. In one configuration, the diffuser 300 extends along the bottom portion of the axles. In a further configuration, the diffuser 300 substantially encompasses the leading and trailing axle. The diffuser can be a single piece construction or multiple piece construction, wherein the multiple pieces are assembled about the axles.

The diffuser 300 can include channels 310 extending generally along the longitudinal axis 16, wherein the channels 310 direct air flow downward and just behind the wheels 34, thereby intersecting road spray and substantially reducing the ability of the road spray to elevate from a road surface.

In a further configuration, the diffuser 300 can be a substantially planar member extending along the longitudinal axis 16 from just ahead of the leading axle to just behind the trailing axle. This configuration accommodates the construction of the tandem by the original equipment manufacturer and the occupation of the space above the leading axle and trailing axle with cabling, hoses and struts. In those constructions of the tandem in which the space above the axles is clear, the diffuser 300 can extend above and below the axles, thereby partially enclosing the axles. In a further configuration, the diffuser 300 (either as single member or multiple component) extends across a majority of a width between the wheels of the leading axle.

The diffuser 300 thus attaches between the axles of the axle assembly and beneath the main frame to span the distance between the axles creating an aerodynamic surface. This surface controls the air flow beneath the semitrailer 12 eliminating the need for a lower door mounted panel on the rear doors. The diffuser 300 also channels the air past a lower bumper of the semitrailer 12 removing the air from the drag stream and also channels a portion of the controlled air to knock down road mist during rain.

Figure 8:
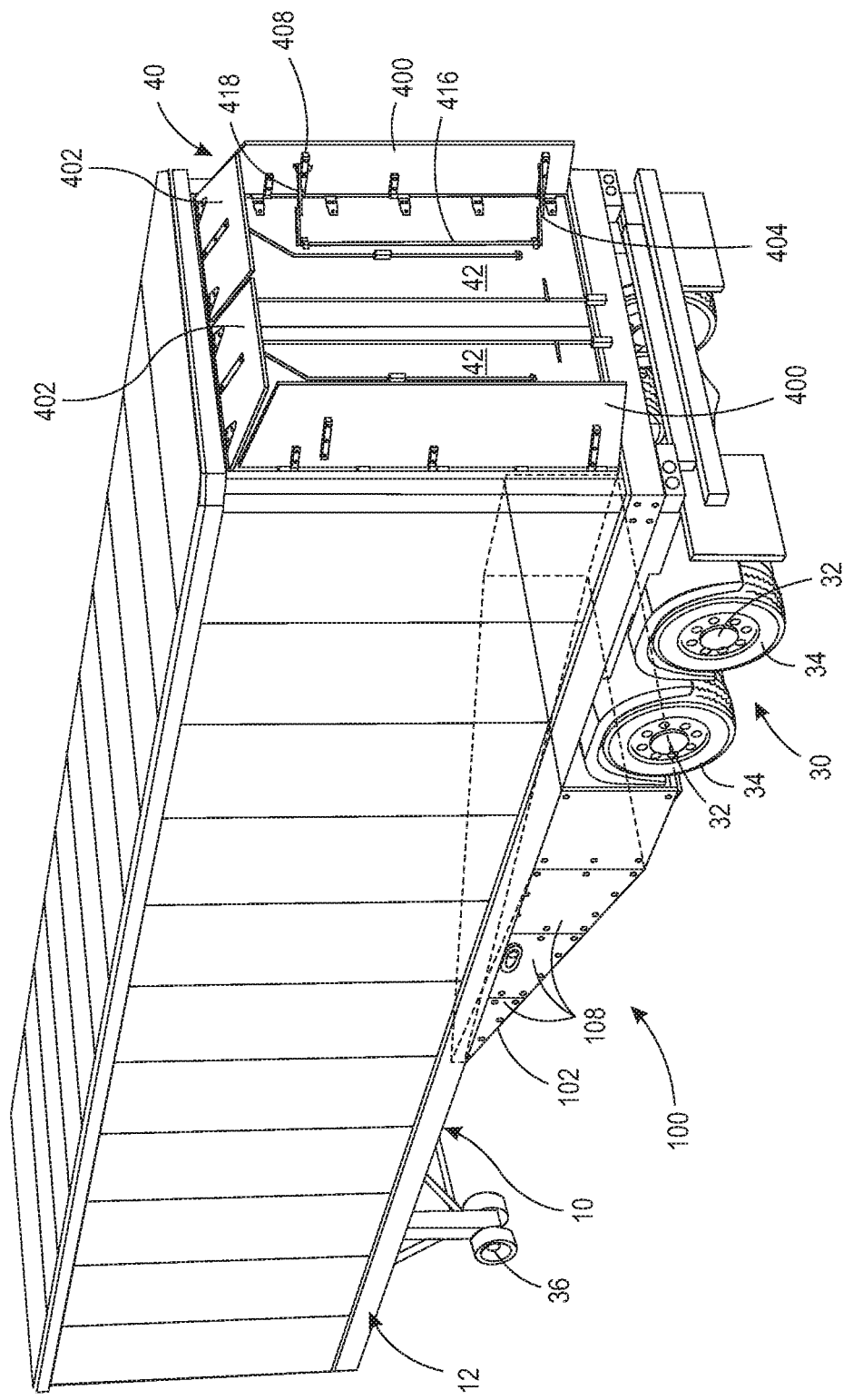
FIG. 8 is a rear perspective view of the semitrailer showing the rear flap system.
Figure 9:
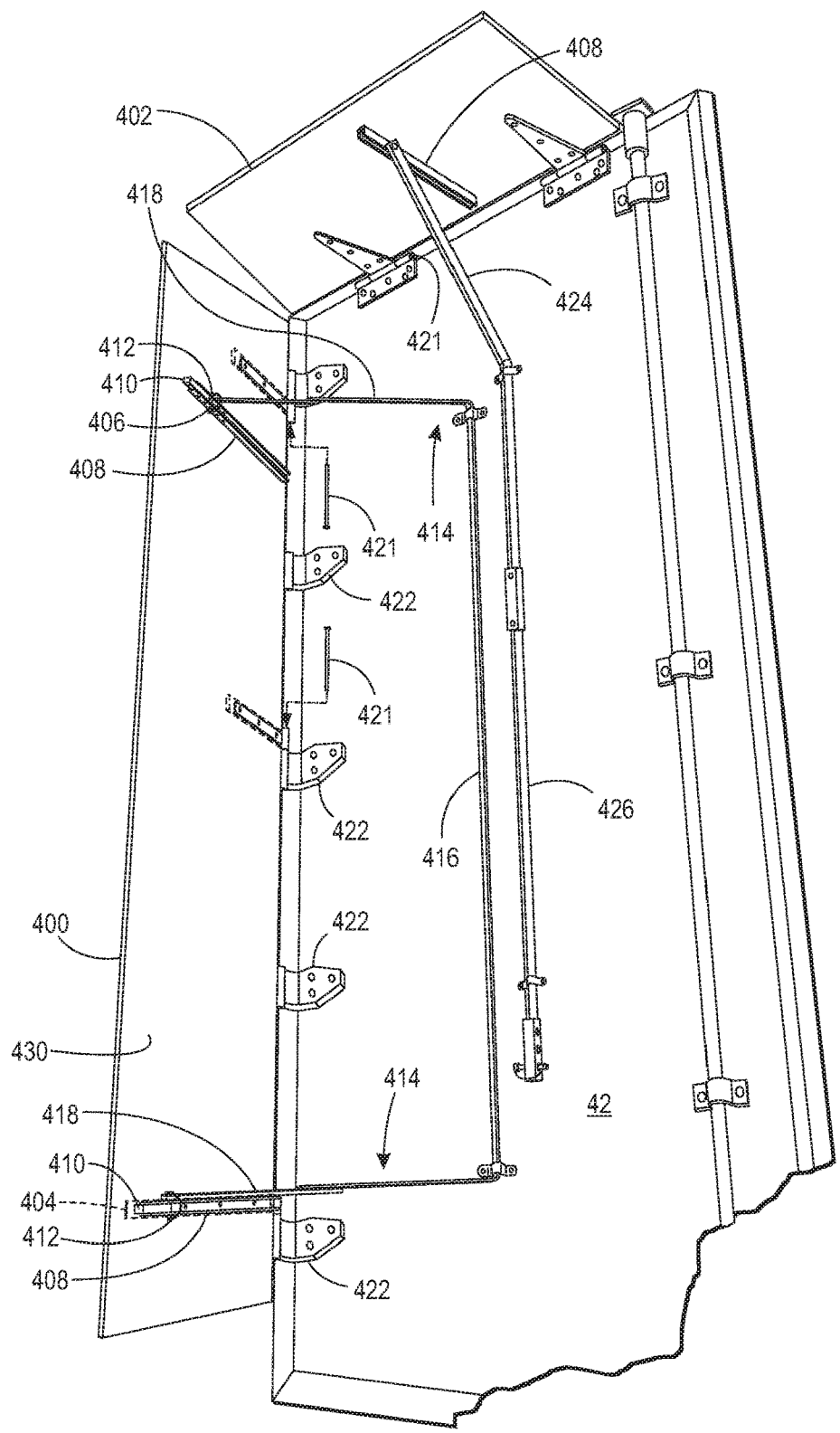
FIG. 9 is a partial perspective view of the rear end of the semitrailer showing a portion of the rear flap system mounted to one door of a semitrailer.

As shown in FIGS. 8 and 9, in those configurations of the semitrailer having a container with a rear end 40 of the container including a pair of openable doors 42 as known in the art, each door 42 can include a vertical flap 400 hingedly connected to the door 42 along an outside edge and a horizontal flap 402 hingedly connected along a top of the door 42. The vertical flap 400 is movable between an extended position extending generally rearward from the rear end 40 of the container to a retracted position wherein the flap 400 is generally parallel to the door 42.

In one configuration, at least a bottom hinge 404 and a top hinge 406 connect the vertical flap 400 to the door 42, wherein the hinges 404, 406, are mechanically connected such that actuation of the bottom hinge 404 will impart actuation of the top hinge 406. A rod or bar can form an interconnect between the hinges 404, 406 for imparting common actuation.

In one configuration, the vertical flap 400 includes at least two attachment points to the door of the container. Each attachment includes a leaf or plate 408 affixed to the flap 402, wherein each plate 408 includes a barrel 410. The plate 408 can be any configuration as dictated by the selected material of the plate 408 and the flap 402. In this configuration, the plate 408 is attached to the door 42 to locate the barrel 410 adjacent to an existing hinge connection between the container door 42 and the container. To install the flap 402, a hinge pin 412 is removed from the corresponding hinge 404 or 406 on the door 42 and the barrel 410 of each of the plates 408 affixed to the flap 402 is aligned with the barrel 420 of the existing hinge 404, 406. An extended hinge pin 412 is then located in the existing hinge 404, 406 and the barrel 410 of the affixed plate 408 of the flap 402. The flap 402 is thus rotatably mounted to the container.

Referring to the drawings, a linkage 414 which is separate from the hinges 404, 406 links the flap 402 to the door 42. The linkage 414 includes a generally U-shape base 416 having a closed end of the U rotatably connected to the door 42, such as by a coupler or channel bracket. Each leg of the U shape base 416 pivotally connects to an arm 418 which in turn is pivotally connected to the door 42. The closed end of the U shape base 416 forms the rod or bar that interconnects the hinge 404, 406 (or linkages) for imparting common actuation.

With respect to the horizontal top flaps 402, these flaps 402 can be hingedly connected to the container door by affixing a hinge plate 422 to the flap 402 and to the door 42 and secured by a pin 421 so that the flap 402 is rotatable between a closed position generally parallel to the door 42 and an open position extending away from the door 42. While the top flaps 402 can be selectively rotated between the open and closed positions by any of a number of mechanisms, a satisfactory mechanism includes a first link 424 having a first end pivotally connected to the horizontal flap 402 at a distance from the axis of rotation of the horizontal flap 402. A second end of the first link 424 is pivotally connected to a slider 426, wherein the slider 426 is connected to the door 42 to vertically slide along a vertical direction. In one configuration, the slider 426 can be pulled vertically downward with a pivoting bar actuated by pushing, causing the horizontal flap 402 to rotate downwards toward the container door 42. Conversely, to dispose the horizontal flap 402 in the open position, the slider 426 is urged upward by pushing causing the flap 402 to rotate to the open position.

Thus, the system provides an aerodynamic system for the rear of the container having four movable flaps—two vertical side flaps 400 and two horizontal top flaps 402—and an axle diffuser 300, as set forth below.

Generally, the rear flaps 400, 402 attach to the top and side of the rear end of the semitrailer, including a side flap 400 and top flap 402 for each door 42. The side flaps 400 include an aerodynamic panel 430 and a mounting that uses the door hinges for swing doors and the door frame for roller doors. The aerodynamic panel material can be plastic, metal, or other semi-rigid to rigid material, including fabric in a frame. To mount the aerodynamic panels 430 to the door 42 and a deployment device, the respective flap 400, 402 is mounted to the truck by the above described method and is deployed by moving the panel 430 into the open position through the use of a pivoting bar. The pivoting bar locks open and closed through the use of the above-described pin system.

In a further configuration, the present disclosure provides for streamlining the semitrailer main frame 14. In this configuration, the main frame 14 includes two and sometimes three (or more) elongate beams extending along the longitudinal axis 16, wherein a multitude of cross beams extending transverse to the elongate beans to provide a rigid frame upon which decking is attached to form the floor or deck of the semitrailer.

In this configuration, a covering 502 is affixed across the bottom (or exposed edge) of the crossbeams to form a substantially continuous undersurface of the semitrailer as shown in FIG. 5. It is contemplated the covering 502 extends over substantially the entire area of the underside of the semitrailer—even between the wheels and the bottom of the main frame. The covering 502 can be any of a variety of materials such as sheet metal, composites, plastics such as polycarbonate, or even tightly drawn fabrics.

The semitrailer includes a covering 502 that runs either longitudinally or horizontally along the bottom of the main frame covering the supporting I-Beams (transverse beams), thereby shielding the beams from the passing air flow. The covering 502 can be any material that is lightweight, durable, weather resistant, road debris resistant. (oil, diesel, gas, tar, mud etc.)

The covering 502 can be attached by any of several methods including tracks, clips, screws, bolts, flashings etc. It is contemplated the I-beam cover can extend all or a portion of the semitrailer bottom—front to back and side to side.

Figure 10:
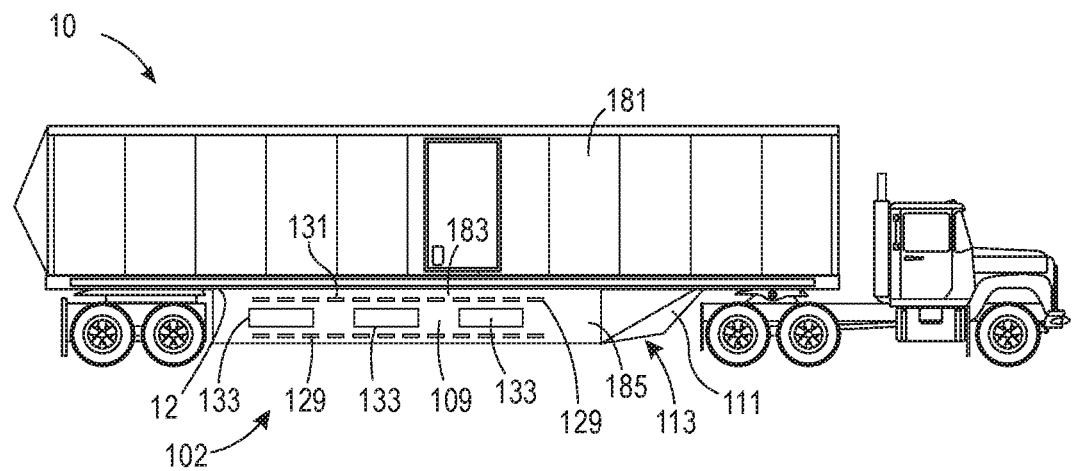
FIG. 10 is a side view of a semitrailer showing a second configuration of the drag force reduction system.
Figure 11:
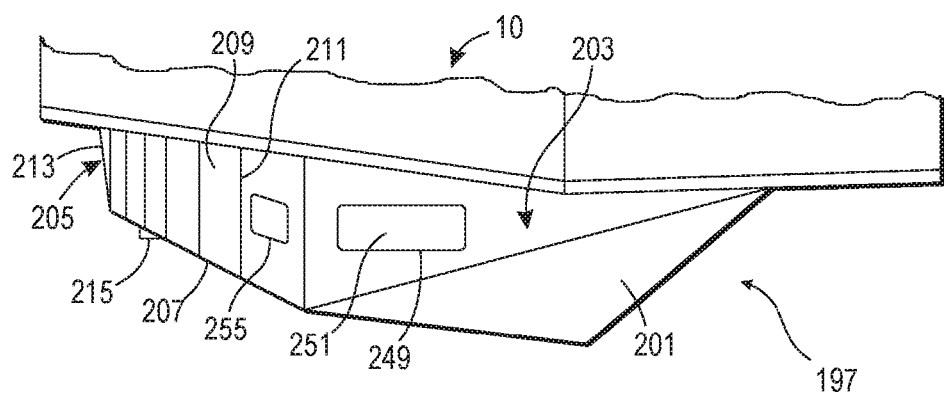
FIG. 11 is a front perspective view of the second configuration of the fairing system.
Figure 15:
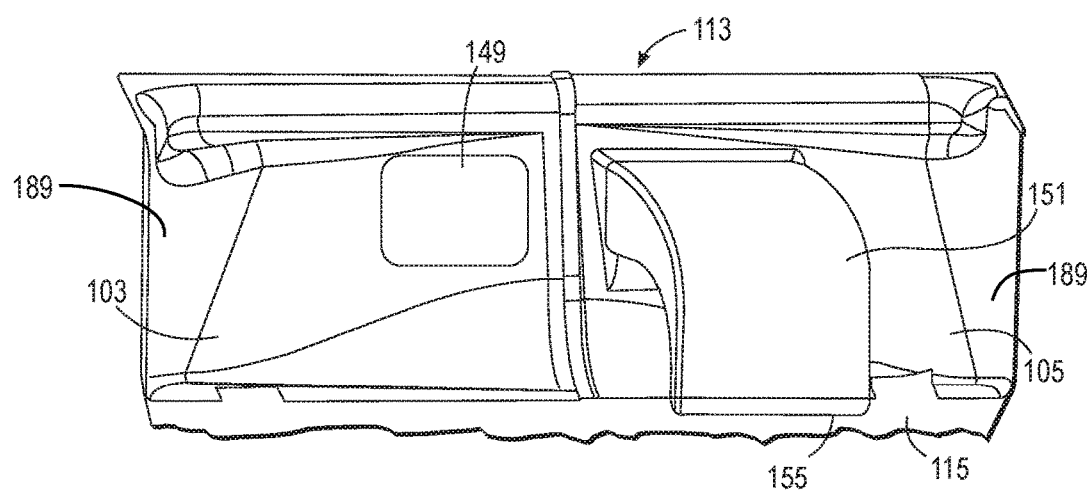
FIG. 15 is a perspective view of the bow of the second configuration of the fairing system showing the venting system.
Figure 17:
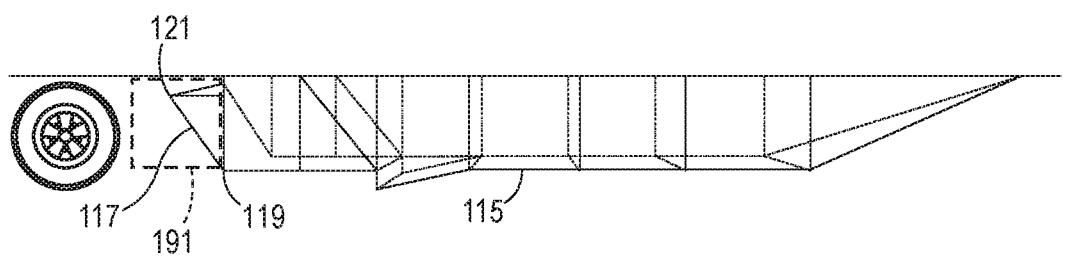
FIG. 17 is a side view of the second configuration of the fairing system.

Referring to FIGS. 10, 11, and 17, in another configuration, a fairing 101 includes a pair of opposing lateral surfaces 109 and a leading surface 111. The pair of opposing lateral surfaces 109 are separated by a distance that is substantially equal to the width of the semitrailer. The distance can vary in width depending on the semitrailer size, design, and to maximize the aerodynamic advantage of the system. By "substantially equal to the width of the semitrailer," it is meant that the opposing lateral surfaces 109 are spaced inwardly from the perimeter side edge of the semitrailer 10 by approximately zero to twenty-four (24) inches and more preferably between zero and eight (8) inches. Alternatively, all or a portion of the lateral surfaces 109 can protrude approximately zero to four (4) inches from the outer perimeter side edge of the semitrailer. The leading surface 111 substantially spans the distance between the opposing lateral surfaces 109 and defines a bow 113 to reduce a drag coefficient of the fairing 101. As shown in FIG. 15 and described below, in one configuration, the bow 113 is formed of two integrally connected panels 103, 105. The panels 103, 105 can each include an upper lip 187 extending forward from the bow 113 and a sidewall 189 integrally connected to a corresponding edge of the lateral surface 109.

Figure 14:
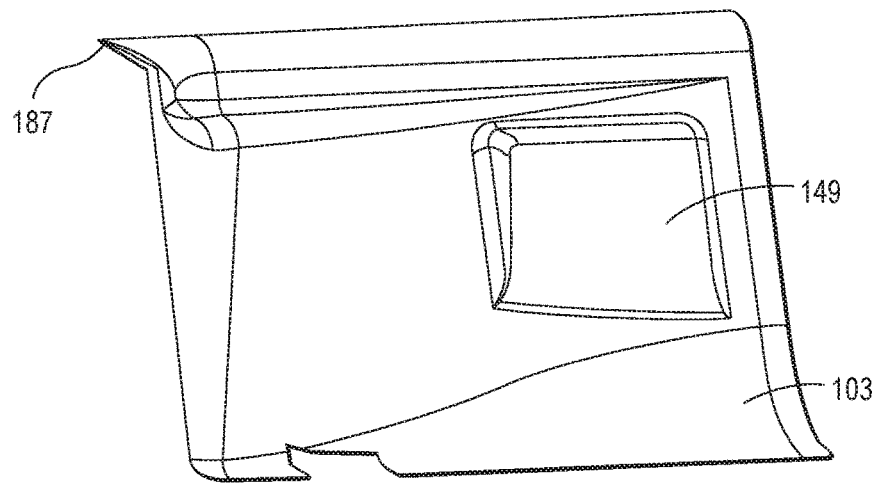
FIG. 14 is a perspective view of one-half of a rear-end back unit.
Figure 16:
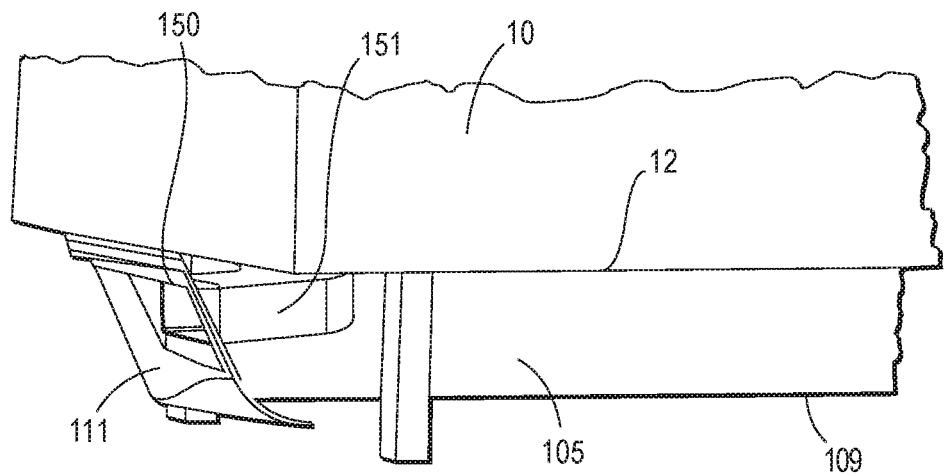
FIG. 16 is a perspective view of one-half of the fairing having a venting system.

The bow 113 can be flat, curved, bulbous, arched, or angled, have a high or low chin, and can have any of the following shapes: tumblehome, plumb, raked, spoon, etc. Further, the bow 113 can be curved or bulbous in the center and substantially flat along the remaining surface. The position of the bow 113 on the undercarriage 12 of a semitrailer 10 can be adjusted according to the vehicle or truck type and the load type. The lateral surfaces 109 can be planar or can have at least one of a convex and concave portion. As shown in FIGS. 14, 15 and 16, in one configuration, the leading surface 111 is formed of two flat, half-bulbous, or slightly-curved panels 103, 105. The leading surface 111 can include at least one intake opening 149 having a diameter range of approximately six inches to approximately four feet. In one configuration, as shown in, for example, FIG. 15, the leading surface 111 includes two intake openings 149 spaced approximately at least one foot apart from each other for a 45-53 foot semitrailer. The openings 149 can include a venting duct 151 fluidly coupling each intake opening 149 to either an exit-opening 155 in the bottom surface 115 as shown in FIG. 15, or an exit-opening in each of the lateral surfaces 109 as shown in FIG. 16. In one configuration, the exit-openings, for example exit-opening 155, have a cross-sectional area that is less than a cross-sectional area of the intake opening, for example, intake opening 149. In another configuration, the exit-openings have a cross-sectional area that is equal to a cross-sectional area of the intake openings. When a tractor-trailer is traveling, the air follows a flow path through intake opening(s) 149 in the leading surface 111, through the venting duct(s) 151 and either out the exit-opening(s) 155 in the bottom surface 115 as shown in FIG. 15 reducing pressure and drag from the bottom surface 115 and along the lateral surfaces 109, or, out the exit-openings 155 in each of the lateral surfaces 109, as shown in FIG. 16, reducing pressure and drag on the lateral surfaces 109.

In one configuration, the bottom surface 115 of the fairing 101 is spaced from the undercarriage 12 of the semitrailer 10 and spans an area bounded by the lateral surfaces 109 and the leading surface 111.

In another configuration, the fairing 101 includes a trailing surface 117 spaced from the undercarriage 12 of the semitrailer 10, the trailing surface 117 substantially spanning the distance between the opposing lateral surfaces 109. Back panel 191 is shown in phantom so that trailing surface 117 can be seen. The trailing surface 117 is spaced from the wheel set and lowers the drag coefficient of the fairing assembly 101. The trailing surface 117 extends from a spaced position from the underside of the semitrailer 10 to a position adjacent the underside of the semitrailer 10, and intermediate the wheel set and the first position 119 such that the trailing surface 117 is angled. The second position 121 of the trailing surface 117 can be between one (1) inch and eighteen (18) inches from the underside of the semitrailer 10 and more preferably between two (2) and nine (9) inches. The bottom surface 115 and the trailing surface 117 substantially enclose a volume beneath the semitrailer 10. By "substantially encloses" it is meant that at least seventy percent (70%) of the undercarriage between the hitch and wheel set is enclosed by the fairing assembly 101.

In another configuration, as shown in FIG. 11, the drag force reduction system 197 includes a frame 211 connected to the undercarriage 12 of a semitrailer 10 and a skin 201 enclosing at least one portion of the frame 211. The frame 211 is sized to be intermediate the hitch and wheel set of a semitrailer 10. The position of the frame 211 on the underside of the semitrailer 10 can be adjusted according to the vehicle or truck type and the load type.

The frame 211 includes a front portion 203, a back portion 205, a bottom portion 207 and two opposing side portions 209 formed by sets of struts. In one embodiment, the struts are metal, plastic or PVC. The side portions 209 are spaced at a distance that is substantially equal to the width of the semitrailer. The back portion 205 is spaced from the wheel set of the semitrailer 10 and includes a top edge 213. In one configuration, the top edge 213 is spaced from the undercarriage of the semitrailer 10. For example, the back portion 205 can be spaced between two and nine inches from the undercarriage 12 of the semitrailer 10. Preferably, the space is approximately six inches. The back portion 205 of the frame 211 extends at an obtuse angle relative to the bottom portion 207.

The frame 211 can have interconnecting modular sections. Preferably, the modular sections are approximately 1 foot to 20 feet wide. More preferably, the modular portions are approximately 2 feet to 10 feet wide. The side portions 209 can be planar or can have at least one of a convex and concave portion. The frame 211 can further comprise aerodynamic fin portions 215 extending from the side portions 209 of the frame 211.

The skin 201 encloses at least one portion of the frame 211 reducing a drag coefficient of the system. In one configuration, the skin 201 substantially encloses the front portion 203, the side portions 209 and the bottom portion 207 of the frame 211. In another configuration, the skin 201 substantially encloses the back portion 205 of the frame 211. The skin 201 can be made from one or more than one of the following: polycarbonate, ABS plastic, metal, rubber, fabric and polyurethane.

In a configuration of the invention, the frame 211 is modular and can be used as a storage system, wherein any singular modular portion 201 is enclosed and includes a resealable access port (not shown) or wherein multiple modular portions are enclosed to form one storage area which includes a resealable access port (not shown).

The front portion 203 may include at least one intake opening 249. In one configuration, the front portion 203 includes two intake openings 249 spaced at least approximately 1 foot apart from each other on a 45-53 foot semitrailer. The openings 249 may include a venting duct 251 fluidly coupling each intake opening 249 to either an exit-opening in the bottom portion 207 or an exit-opening 255 in each of the opposing side portions 209. When a tractor-trailer is traveling, the air follows a flow path through intake opening(s) 249 in the front portion 203, through the venting duct(s) 251 and either out the exit-opening(s) 255 in the bottom portion 207 reducing pressure and drag from the bottom portion 207 and along the side portions 209 or out the exit-openings 255 in each of the side portions 209 reducing pressure and drag on the side portions 209.

Figure 12:
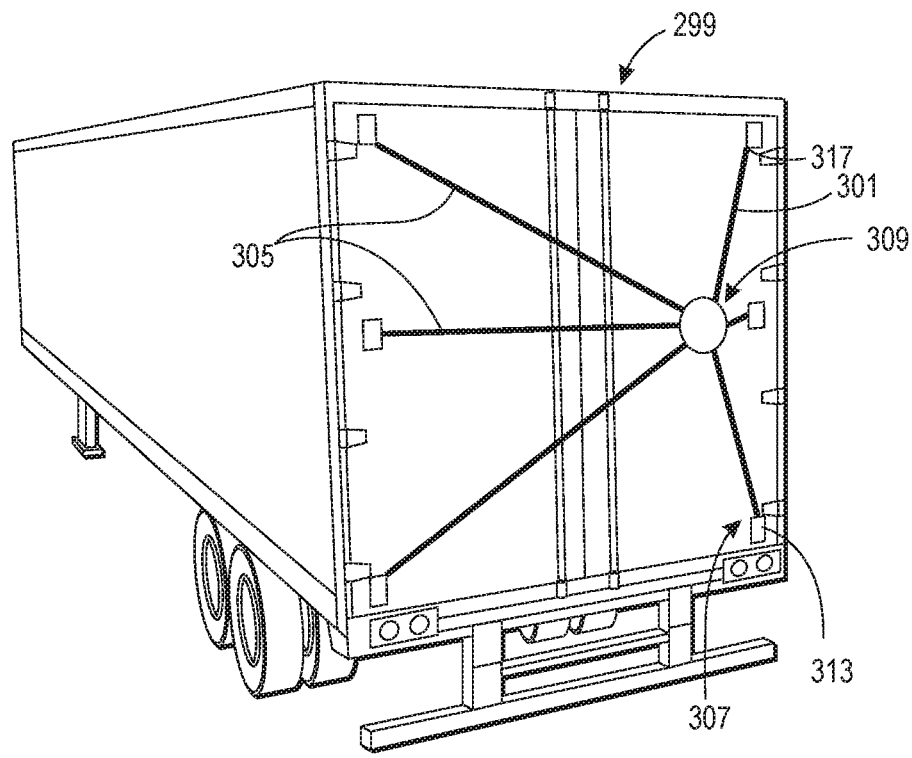
FIG. 12 is a perspective view of a rear-end of the semitrailer showing a frame of a back unit without a skin.
Figure 13:
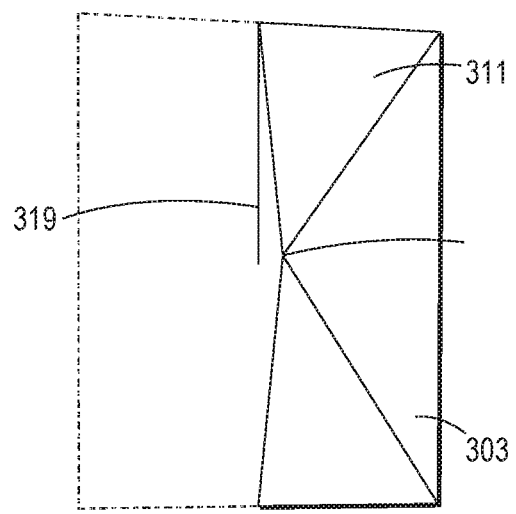
FIG. 13 is a perspective view of one-half of a rear-end back unit.

As shown in FIGS. 10, 12, and 13, the drag reduction system may include a back unit 301 for mounting to a back planar surface of the semitrailer 10. The back unit 301 includes either one frame 301 or two half-frames (also referred to herein as first and second frames) 303 that together circumscribe a back planar surface of the semitrailer 10. The frame 301 or half-frames 303 are formed of a plurality of struts 305 and include a base portion 307. In the one frame configuration, the frame 301 is approximately pyramidal. In the one frame 301 configuration, the frame 301 includes a base portion 307 arranged proximate the back planar surface of the semitrailer 10 and a protruding portion 309 arranged distal to the back planar surface of the semitrailer 10. The first and second frames 303 can each form approximately ½ of a pyramid. The base portion 307 of the one of the half-frames 301 circumscribes approximately half of the back planar surface of the semitrailer and the base portion of the second frame circumscribes approximately the other half of the back planar surface of the semitrailer 10. In this configuration, each half-frame 303 includes a center post 319 and guide lock for locking the half-frame 303 on to the rear-end of the semitrailer 10 during installation and for releasing the guide lock upon removal of each half-frame 303.

A material 311 substantially encloses the back unit frames 301 or 303. To secure the back unit to the semitrailer 10, hinges 313 are fixed to the back planar surface of the semitrailer 10 as well as hinge bolts for receiving a first terminal end 317 of each strut 305. One end of each strut 305 includes a pivoting connector arranged to engage one of the hinge bolts. It should be appreciated by those having ordinary skill in the art that other connectors and anchors can be used to secure the back unit to the semitrailer, including but not limited to anchors, swivel joints, connectors, and vertical anchors.

Preferably, the material 311 is flexible and pulled taut around the frame 301. Although the material 311 is set forth as enclosing the frame 301, it is understood the material 311 can be connected to the frame 301 to be within the volume defined by the frame 301. However, such construction requires more fasteners connecting the material 311 to the frame 301.

This invention being thus described, it will be obvious that the same may be varied in many ways. Such variations are not to be regarded as a departure from the spirit and scope of the invention and all such modifications are intended to be included within the scope of the following claims.

The invention claimed is:
1. A drag force reduction system comprising:
(a) a semitrailer having a main frame extending along a longitudinal axis and a subframe movably connected to the main frame between a first position along the longitudinal axis and a second position along the longitudinal axis;
(b) an axle assembly attached to the subframe, the axle assembly including an axle, a plurality of wheels and a suspension; and
(c) a fairing located under the main frame and connected to one of the axle assembly, the subframe, or located under the main frame and separated from the axle assembly along the longitudinal axis by a given spacing, the fairing being movable along the longitudinal axis relative to the main frame, while maintaining the connection to the one of the axle assembly, the subframe, or the main frame, to maintain the given spacing between the axle assembly and the fairing.

2. The drag force reduction system of claim 1, wherein the fairing is slidably connected to the main frame.

3. The drag force reduction system of claim 1, wherein the fairing is slidably connected to the subframe.

4. The drag force reduction system of claim 1, wherein the fairing includes a fairing frame having a mounting portion and a frame retaining portion, wherein the mounting portion is movable relative to the retaining portion along the longitudinal axis.

5. The drag force reduction system of claim 1, wherein the fairing is connected to the subframe at the given spacing.

6. The drag force reduction system of claim 1, wherein the fairing is affixed to one of the axle assembly and the subframe.

7. The drag force reduction system of claim 1, wherein the fairing is connected to the subframe and translatable relative to the subframe.

8. The drag force reduction system of claim 1, wherein the subframe can be located at any of a multitude of positions.

9. The drag force reduction system of claim 1, wherein the given spacing is adjustable within a predetermined fairing range of motion.

10. The drag force reduction system of claim 1, wherein the fairing includes a bottom and a leading apex formed of a plurality of converging planar regions.

11. The drag force reduction system of claim 1, wherein the fairing includes a bottom surface and a trailing surface, a leading surface and lateral surfaces, the bottom surface and the trailing surface substantially enclosing a volume beneath the semitrailer.

12. The drag force reduction system of claim 1, wherein the axle assembly includes a leading axle and a trailing axle, each of the leading axle and the trailing axle having at least two wheels for rotation relative to the main frame; and
a diffuser extending about a portion of the leading axle, the diffuser extending along a majority of the distance between the wheels of leading axle, wherein the diffuser directs a passing air flow toward the ground.

13. The drag force reduction system of claim 1, the fairing includes an intake opening and at least one flow path fluidly connecting the intake opening and an exit-opening formed in the fairing.

14. The drag force reduction system of claim 13, wherein the at least one flow path includes at least one venting duct extending from the intake opening to the at least one exit-opening.

15. The drag force reduction system of claim 1, wherein the main frame further includes a plurality of elongate beams extending along a longitudinal axis and a plurality of cross beams connected to the elongate beams and extending transverse to the longitudinal axis, an upper surface of the cross beams and the elongate beams supporting a decking and the decking, the elongate beams and the cross beams defining a plurality of cavities opening to an underside of the semitrailer; wherein a covering on an underside of the semitrailer substantially occludes the plurality of cavities.

16. The drag force reduction system of claim 15, wherein the covering is connected to the elongate beams and the cross beams.

17. The drag force reduction system of claim 15, wherein a portion of the covering is disposed between the wheels and one of the elongate beams and the cross beams, and wherein the covering comprises a material selected from the group consisting of a polymer, composite, laminate, metal, and plastic.

18. The drag force reduction system of claim 1, further comprising a closable container on the main frame, the container having a rear end and a pair of doors movable between a closed position and an open position, each door hingedly connected to the container to pivot about a vertical axis; a vertical flap; at least an upper hinge and a lower hinge hingedly connected to one of the doors and the vertical flap to pivot the vertical flap about a vertical axis; and an interconnector extending between the upper hinge and the lower hinge, such that upon movement of the lower hinge from an open configuration to a closed configuration, the upper hinge moves from an open configuration to a closed configuration.

19. The drag force reduction system of claim 1, wherein the fairing is positioned along the longitudinal axis independent of the subframe being in the first or second position.

20. The drag force reduction system of claim 19, wherein the fairing is slidably connected to the subframe.

21. The drag force reduction system of claim 1, wherein the fairing is positioned along the longitudinal axis dependent of the subframe being in the first or second position.

22. A method comprising:
 (a) providing a semitrailer having a main frame extending along a longitudinal axis and a subframe movably connected to the main frame between a first position along the longitudinal axis and a second position along the longitudinal axis;
 (b) providing an axle assembly attached to the subframe, the axle assembly including an axle, a plurality of wheels and a suspension;
 (c) connecting a fairing under the main frame to one of the axle assembly, the subframe, or the main frame and separated from the axle assembly along the longitudinal axis by a given spacing; and
 (d) moving the fairing along the longitudinal axis relative to the main frame, while maintaining the connection to the one of the axle assembly, the subframe, or the main frame, to maintain the given spacing between the axle assembly and the fairing.

23. The method of claim 22, wherein the fairing is slideably connected to one of the main frame, the subframe and the axle assembly.

* * * * *